(12) United States Patent
Lou et al.

(10) Patent No.: US 10,321,366 B2
(45) Date of Patent: *Jun. 11, 2019

(54) FACILITATION OF WIRELESS NETWORK SESSION CONTINUITY

(71) Applicant: AT&T INTELLECTUAL PROPERTY I, L.P., Atlanta, GA (US)

(72) Inventors: Yuang Lou, Dunwoody, GA (US); Douglas A. Duet, Roswell, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 17 days.

This patent is subject to a terminal disclaimer.

(21) Appl. No.: 15/872,968

(22) Filed: Jan. 16, 2018

(65) Prior Publication Data

US 2018/0160341 A1 Jun. 7, 2018

Related U.S. Application Data

(63) Continuation of application No. 14/747,429, filed on Jun. 23, 2015, now Pat. No. 9,906,996.

(51) Int. Cl.
*H04W 24/02* (2009.01)
*H04W 36/00* (2009.01)
*H04W 36/26* (2009.01)
*H04W 84/12* (2009.01)

(52) U.S. Cl.
CPC ........ *H04W 36/0066* (2013.01); *H04W 24/02* (2013.01); *H04W 36/0022* (2013.01); *H04W 36/26* (2013.01); *H04W 84/12* (2013.01)

(58) Field of Classification Search
CPC ............. H04W 24/02; H04W 36/0022; H04W 36/0066; H04W 36/26; H04W 84/12
See application file for complete search history.

(56) References Cited

U.S. PATENT DOCUMENTS

| | | | |
|---|---|---|---|
| 9,036,473 B2 | 5/2015 | Himayat et al. | |
| 9,363,781 B2 | 6/2016 | Won et al. | |
| 9,648,560 B2* | 5/2017 | Cui | ........................ H04W 48/20 |
| 2005/0018686 A1 | 1/2005 | Igarashi et al. | |
| 2006/0025141 A1 | 2/2006 | Marsh et al. | |
| 2006/0025151 A1* | 2/2006 | Karaoguz | ......... H04L 29/06027 |
| | | | 455/455 |
| 2007/0160017 A1 | 7/2007 | Meier et al. | |

(Continued)

OTHER PUBLICATIONS

Non-Final Office Action for U.S. Appl. No. 14/747,429 dated May 19, 2017, 24 pages.

(Continued)

*Primary Examiner* — Kevin D Mew

(74) *Attorney, Agent, or Firm* — Amin, Turocy & Watson, LLP

(57) ABSTRACT

Internet protocol session continuity can be achieved via an access point registration process. Mobile devices near an access point device that has registered with a base station device can offload wireless communication from the base station device to the access point device. The access point device can be a known access point device that can be secured and subject to session continuity policies of a service provider. The session continuity policies can be stored at a content handover processor, which can oversee the handover processes between the base station device and the mobile device.

20 Claims, 12 Drawing Sheets

(56) References Cited

U.S. PATENT DOCUMENTS

| | | | |
|---|---|---|---|
| 2008/0076411 A1* | 3/2008 | Khetawat | H04W 24/02 455/432.1 |
| 2008/0076412 A1 | 3/2008 | Khetawat et al. | |
| 2009/0168735 A1* | 7/2009 | Mizukoshi | H04W 12/10 370/338 |
| 2012/0030331 A1* | 2/2012 | Karampatsis | H04L 41/0893 709/223 |
| 2012/0294234 A1 | 11/2012 | Bradish et al. | |
| 2013/0336287 A1 | 12/2013 | Abraham et al. | |
| 2013/0343292 A1* | 12/2013 | Westerberg | H04W 88/10 370/329 |
| 2014/0031054 A1 | 1/2014 | Zou et al. | |
| 2014/0043979 A1 | 2/2014 | Etemad et al. | |
| 2014/0050086 A1 | 2/2014 | Himayat et al. | |
| 2014/0073289 A1* | 3/2014 | Velasco | H04W 12/04 455/411 |
| 2014/0160937 A1 | 6/2014 | Richards | |
| 2014/0204925 A1* | 7/2014 | Otomo | H04W 68/04 370/338 |
| 2014/0295838 A1 | 10/2014 | Won et al. | |
| 2014/0362780 A1 | 12/2014 | Malladi et al. | |
| 2014/0376483 A1 | 12/2014 | Hong et al. | |
| 2015/0023315 A1 | 1/2015 | Yerramalli et al. | |
| 2015/0045032 A1 | 2/2015 | Tomici et al. | |
| 2015/0049712 A1 | 2/2015 | Chen et al. | |
| 2015/0049741 A1 | 2/2015 | Chen et al. | |
| 2015/0055588 A1 | 2/2015 | Yerramalli et al. | |
| 2015/0085797 A1 | 3/2015 | Ji et al. | |
| 2015/0092702 A1 | 4/2015 | Chen et al. | |
| 2015/0092743 A1* | 4/2015 | Ji | H04J 11/0023 370/331 |
| 2015/0126207 A1 | 5/2015 | Li et al. | |
| 2015/0305070 A1 | 10/2015 | Ahmad | |
| 2015/0327110 A1 | 11/2015 | Jeong et al. | |
| 2016/0234687 A1 | 8/2016 | Dai et al. | |
| 2016/0381699 A1 | 12/2016 | Rubin et al. | |
| 2017/0127243 A1 | 5/2017 | Glass et al. | |

OTHER PUBLICATIONS

Notice of Allowance for U.S. Appl. No. 14/747,429 dated Oct. 16, 2017, 22 pages.

* cited by examiner

FACILITATION OF WIRELESS NETWORK SESSION CONTINUITY

RELATED APPLICATION

This patent application is a continuation of, and claims priority to, U.S. patent application Ser. No. 14/747,429 (now U.S. Pat. No. 9,906,996), filed Jun. 23, 2015, and entitled, "FACILITATION OF WIRELESS NETWORK SESSION CONTINUITY," the entirety of which application is hereby incorporated by reference herein.

TECHNICAL FIELD

This disclosure relates generally to facilitating mobile session continuity of licensed wireless network traffic from a base station device to an access point device, via the proposed session continued process, to be converted to a Wi-Fi access point device but maintain the same user session seamlessly to the same user access device over an unlicensed radio band. More specifically, this disclosure relates to a security registration process between the base station device and the access point device to facilitate the wireless network traffic-session continuity.

BACKGROUND

Mobile data offloading is the use of complementary network technologies for delivering data originally targeted for cellular networks. Rules triggering the mobile offloading action can be set by either an end-user (mobile subscriber) or an operator. The code operating on the rules can reside in an end-user device, in a server, or can be divided between the two. End users can do data offloading for data service cost control and the availability of higher bandwidth. Operators can do it to ease congestion of cellular networks. Example complementary network technologies used for mobile data offloading are wireless fidelity (Wi-Fi), femtocell and integrated mobile broadcast.

The increasing need for offloading solutions is caused by the explosion of Internet data traffic, especially the growing portion of traffic going through mobile networks. This has been enabled by smartphone devices possessing Wi-Fi capabilities together with large screens and different Internet applications, from browsers to video and audio streaming applications. In addition to smart phones, laptops with 3G access capabilities are also seen as a major source of mobile data traffic. Additionally, Wi-Fi is typically much less costly to build than cellular networks.

The above-described background relating to a network traffic offloading is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
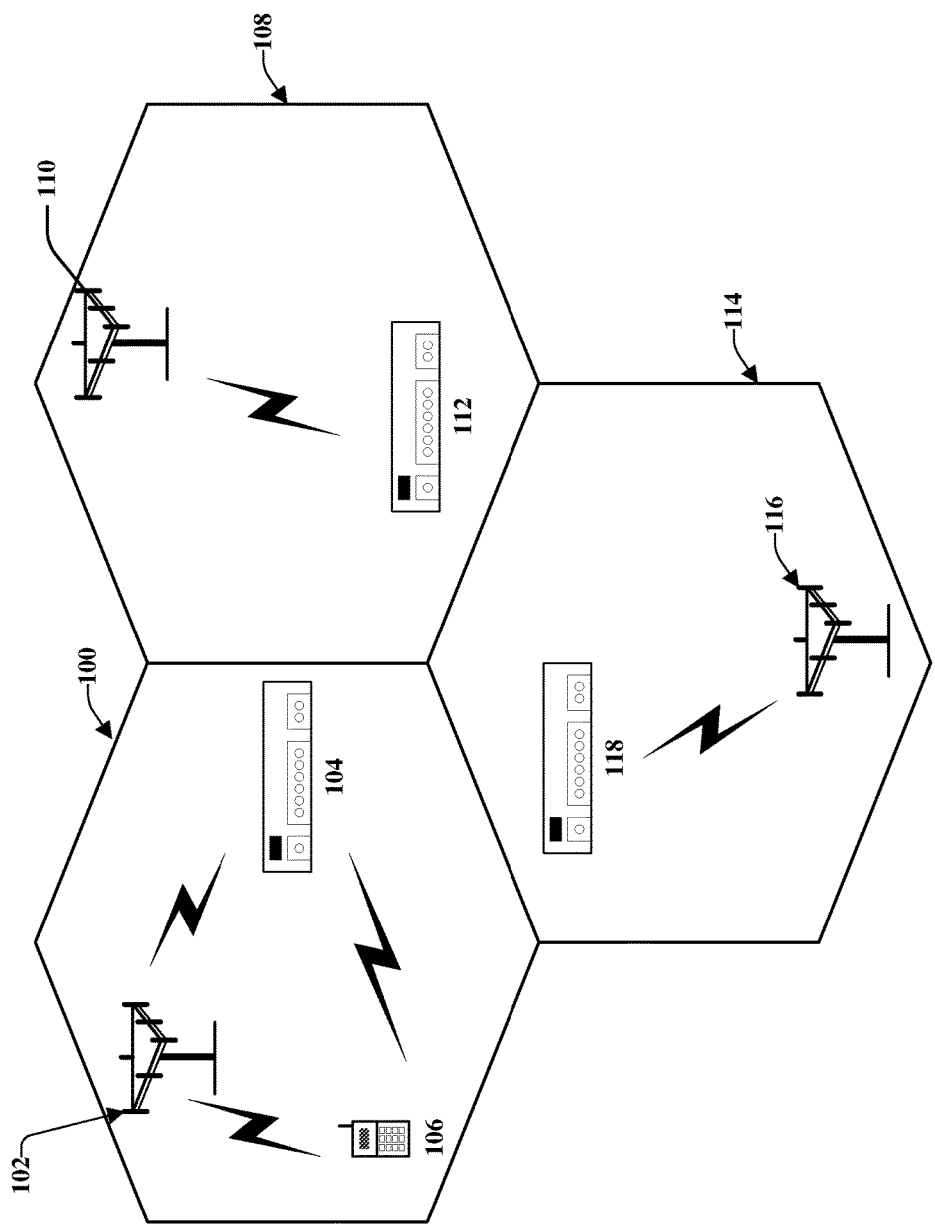
FIG. 1 illustrates an example wireless network comprising access point devices registered to respective base station devices according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular mobility management, various embodiments are described herein to facilitate a seamless handoff of communication between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate wireless network traffic session continuity. Facilitating wireless network traffic session continuity can be implemented in connection with any type of device with a connection to the communications network such as: a mobile handset, a computer, a handheld device, or the like.

Mobile data traffic has been grown over recent years and will continue to grow. Traffic from mobile streaming content delivery accounts for over fifty percent of the total mobile data traffic in recent years. However, these market trends can be mitigated by managing existing radio resources by maximizing spectral efficiency such as: the implementation of multiple-input and multiple-output (MIMO), carrier aggregation (CA), and/or adaptive beamforming targeting for a better quality of experience (QoE) to mobile data users.

Beyond the spectral efficiency, raising radio data capacity directly can depend on the quantity of available spectrum resources. Service providers have been exploring opportunities to acquire more radio frequency (RF) spectrum. Cellular spectral efficiency resources of available RF spectrum are sparse. Therefore, demand for acquiring more RF access spectrum has become can be a bottleneck to future mobile radio developments.

One solution to increase cellular spectral efficiency can be to share mobile access from a licensed access to an unlicensed spectrum. For example, long term evolution (LTE) or license assisted access (LAA) development over a service provider's Wi-Fi network can be used to increase spectral efficiency. It should be noted that, although LTE is used as an example wireless communication standard throughout this disclosure, other standards for wireless communication, either known or unknown, can be used to facilitate the processes herewith. For instance, a similar interoperability radio access technology (RAT) process can be extended to all mobile networks including, but not limited to, 2G/3G/4G networks.

There are many 3rd party Wi-Fi access points deployed in the field. Leveraging use of these Wi-Fi access points can be used to gain access to their coverage area for the session continuity of licensed access in a secure and stable environment.

One challenge in exploiting Wi-Fi coverage, with 3rd party Wi-Fi access points being widely distributed within the LTE coverage, is that they are not presently compatible with LTE networks. Therefore, the LTE network cannot connect to the Wi-Fi access points due to compatibility concerns. However, this problem can be addressed by facilitating a compatible connection to the 3rd party Wi-Fi access points and open a mutually beneficial interoperable bridge between the LTE network and Wi-Fi access points. Once the bridging connection is created for LTE and Wi-Fi networking, session continuity between licensed LTE and unlicensed Wi-Fi mobile access can be developed to facilitate smooth and secure interoperability.

There are two objectives of this disclosure. The first objective is to open a mutually incentivized channel between an LTE service provider and owners of 3rd party Wi-Fi access points so that the 3rd party Wi-Fi access points can be motivated to register with the LTE network. Thereafter, the second objective of this disclosure is for the LTE service provider to be able to connect to the 3rd party Wi-Fi access points after the Wi-Fi access points have been reconfigured to meet the LTE security and QoE requirements.

Mobile user equipment (UE) can interoperate between LTE networks and Wi-Fi access points in the following manner. The UE can initiate a mobile session on the LTE network. When the UE reaches a Wi-Fi coverage area generated by a Wi-Fi access point device, an auto-detect and reconnect process can be initiated on the UE. Once the UE access to the Wi-Fi access point device is complete, the UE current LTE data session can be stopped, and a new data session can be switched to the local 3rd party Wi-Fi access point device. This process of session continuity can release LTE spectrum for highly mobile access users and allow the user data access experience to continue on the local Wi-Fi access point device. However, this type of session continuity does not require the LTE network to learn the existence of 3rd party Wi-Fi access points device.

Thus, the aforementioned session continuity can negatively impact QoE by randomly stopping a mobile streaming session, particularly in a mixed Wi-Fi and LTE coverage area such as in the office building, mall, or other public areas. In order to provide a continuously smooth session for mobile streaming service delivery and session continuity, the LTE network can be aware of the existence of the 3rd party Wi-Fi access point devices, and the 3rd party Wi-Fi access point devices can be pre-loaded with software packages under an interoperability agreement with the LTE service providers in terms of guaranteed consumer QoE and access security.

When a mobile UE accesses a mobile streaming service, an anchor point can be created in the LTE network that can track its traffic flow whether it is on the LTE network or has a session continued connection to a 3rd party Wi-Fi access point device. As long as the connection is active, the mobile session billing can be continued since the user is not aware of the access connection and the LTE network still has to protect its access QoE. The proposed session continuity process can be monitored and managed by a network anchor, which is different from a conventional mobility anchor. The conventional mobility anchor can only work on licensed spectrum access, whereas the newly proposed session continued network anchor can operate across licensed and unlicensed RF domains. It can link the licensed and unlicensed RF domains while sitting at the side of a licensed network. The deployment of this anchor management function to support the session continuity can comprise an unlicensed owner agreement and software update in an unlicensed access point. Targeted mobile content delivery can be either real-time event broadcasting or near real-time television recording, which can be different from mobile data access.

Many local stores provide free Wi-Fi access to their customers. This type of free Wi-Fi offering can continue even after the Wi-Fi access point has been configured for LTE interoperability. To attract local Wi-Fi access point owners to register their Wi-Fi access point devices to the LTE network and sign an agreement for QoE and access security with an LTE service provider, the LTE service provider can incentivize the local Wi-Fi access point owners for the mobile streaming session access carried by the local Wi-Fi owner's access point device. Incentives can be monetary, coupons, discounts, etc. In addition, the LTE network provider can reduce a churn rate by providing mobile users with a better LTE streaming experience. Whenever the mobile streaming content on the LTE network is session continued to the local Wi-Fi access point device, the user can have a better RF connection experience with improved streaming quality.

In this architecture, both the Wi-Fi and cellular radios can transmit and receive independently but simultaneously from both their network access points, including the cellular tower antenna and the mobile devices. The RF connection in the LTE network can be managed by a radio resource control (RRC) component, and the RF connection of Wi-Fi access network can be managed by a radio resource management (RRM) component.

The RRM is a system level control of co-channel interference and other radio transmission characteristics in wireless communication systems (cellular networks, wireless networks and broadcasting systems). RRM can comprise strategies and algorithms for controlling parameters such as transmit power, user allocation, beamforming, data rates, handover criteria, modulation schema, error coding schemes, etc. The RRM can be used to utilize limited radio-frequency spectrum resources and radio network infrastructure as efficiently as possible.

Functions of the RRC can comprise connection establishment and release functions, broadcast of system information, radio bearer establishment reconfiguration and release, RRC connection mobility procedures, paging notification and release and outer loop power control. By means of signaling functions, the RRC can configure user and control planes according to a network status and allow for RRM strategies to be implemented. Operation of the RRC can be guided by a state machine, which defines specific states that a mobile device may be present in. The different states in the state machine can have different radio resources associated with them. These are the resources that the mobile device may use when it is present in a specific state. Since different amounts of resources are available at different states, the quality of the service that the user experiences and the energy consumption of the mobile device can be influenced by this state machine.

A content handoff processor (CHP) can be implemented in an LTE backhaul network. For example, the local Wi-Fi access point devices under a cellular tower A coverage can register at the CHP through the cellular tower A and all the local Wi-Fi access point devices under a cellular tower B coverage can register at the CHP through the cellular tower B so that under each LTE cellular tower, there is a neighbor list of available Wi-Fi access points. The CHP can assign access for each local Wi-Fi access point device per the cellular network policy, and the mobile devices can follow this priority list. Access priority can be conditioned upon access point device radio frequency signal quality, access point device packet data speed, speed of the mobile device, geographical location, etc. Further, one CHP can cover multiple cellular towers. If a 3rd party Wi-Fi access point device chooses not to register on a cellular network, it can keep its privacy and there will be no cellular session continuity camping on that access point device.

For example, while a UE device is connected to the LTE network through a cellular tower A and detects the existence of a stable connection through a registered local Wi-Fi access point device on the cellular tower A, the mobile device can send a Wi-Fi access request to the CHP pending a permission setting. The CHP can estimate the UE's speed through cellular tower A coverage and if the UE's speed is high, the CHP can reject the access request. The mobile device can then remain on cellular access and not switch to the Wi-Fi access point device.

In yet another example, the CHP can approve the session-continued Wi-Fi access if a UE's speed is low. The UE device can follow a Wi-Fi device priority list based on its available Wi-Fi access associated with its registered cellular tower. Once the UE device connects to the targeted Wi-Fi access point device, the UE device can request cellular session data/information from the cellular network. The cellular data/information can include, but is not limited to: internet protocol (IP) socket data, connection port data of a serving gateway (S-GW), and/or connection port data of a packet data network gateway (P-GW). The cellular data/information can then be passed to the Wi-Fi RRM via Wi-Fi access. Wi-Fi access content can pass through an LTE network security process for non-trusted wireless access. The Wi-Fi RRM can contact the LTE RRC to timely match the two IP sessions through the P-GW. The RCC can also adjust the Wi-Fi access timing to so that the content of data flowing from two IP sessions (one is from the LTE network device and the other is from the local Wi-Fi access point device) are in sync. The Wi-Fi access point device can then take over and the RF access to the LTE network can be released. However, the original LTE anchor point can still track the continued mobile session. In this manner, a session continued inter-radio access from cellular to Wi-Fi proceeds. Although this process can UE device initiated, the process can still be under the LTE network assistance and control. Wi-Fi registration to the CHP can be local and can be updated frequently and/or periodically. Mobile UE device power consumption can be minimized by the LTE network maintaining the session continuity support processes.

The aforementioned processes, which are managed under the control of the service provider to facilitate session continuity to local Wi-Fi networks, can be varied and distinguished by the service provider, by a business strategy, and/or by a local CHP set-up. The benefits for the LTE service provider can comprise reducing the churn rate by providing a better mobile QoE for mobile streaming services with more LTE traffic offloaded to the Wi-Fi network. The benefit for the local Wi-Fi access network operator can comprise paid consumer mobile streaming traffic in addition to their free Wi-Fi access strategy.

As mentioned above, the process can be reversely implemented so that when the mobile device is leaving the Wi-Fi coverage area, it can reattach to the LTE network. The process can support seamless session continuity for voice over LTE (VoLTE), voice over IP (VoIP), and/or IP voice services such as voice over Wi-Fi (VoWi-Fi) connection. It can also support session continuity for mobile streaming content delivery.☐ The process can cover $3^{rd}$ Generation Partnership Project (3GPP) or non-3GPP accesses, and also cover trusted and non-trusted accesses.☐ In the case of the non-trusted access, a security process is required prior to the handoff of the IP data session. The session continued transactions can be IP data content matching centric.

The features of this process can comprise a hard RF handoff following a matching of packet data content in an IP-based session. ☐IP security can be added to all non-3GPP data access. The registered Wi-Fi access point devices can become a part of an enhanced broadband mobile ☐deployment strategy for session continuity, which can be initiation by the UE device but supported and controlled by the network.

In one embodiment, described herein is a method comprising receiving signal data related to a mobile device communication with a base station device and receiving registration data related to registration with an access point device. Thereafter, a request to access the access point device is received from the mobile device, and sending connectivity data based on whether a condition is satisfied.

According to another embodiment, a system can facilitate, the receiving of mobile device data related to a communication of a mobile device with a base station device, and facilitate receiving access point device data related to an access point device of a network. The system can also facilitate receiving other mobile device data related to another communication of the mobile device with the access point device and continuing of the other communication with the access point device based on a condition being determined to have been satisfied.

According to yet another embodiment, described herein is a computer readable medium that can perform the operations comprising receiving first network data related to a first communication of a mobile device with a base station device, receiving second network data related to the base station releasing the first communication with the mobile device, and receiving access point device data related to an access point device of a network. The computer readable medium can also perform the operations comprising receiving third network data related to the access point device establishing a second communication with the mobile device, and monitoring the second communication for a change in data throughput.

These and other embodiments or implementations are described in more detail below with reference to the drawings.

Referring now to FIG. 1, illustrated is an example wireless network comprising access point devices registered to respective base station devices according to one or more embodiments. A wireless network, as represented in FIG. 1, can comprise several base stations 102 110 114. Each base station 102 110 114 can comprise a geographic area 100 108 114 serviced by that particular base station 102 110 114. For instance, the base station 102 can comprise the geographic area 100, the base station 110 can comprise the geographic area 108, and the base station 116 can comprise the geographic area 114. It should also be noted that geographic areas 100 108 114 can also overlap each other based on the proximity of each base station 102 110 114.

Each base station 102 110 114 can comprise an access point device 104 112 118 within its respective geographic area 100 108 114. For example, the base station 102 can comprise the access point device 104 because it is located within the geographic area 100, the base station 110 can comprise the access point device 112 because it is located within the geographic area 108, and the base station 116 can comprise the access point device 118 because it is located within the geographic area 114.

Each access point device 104 112 118 can register with each base station 102 110 114 via a content handoff processor (CHP) that can be implemented in a backhaul network. The access point devices 104 112 118 can be reconfigured to meet specific security and QoE requirements. For example, the access point device 104 can register with base station 102 via a CHP associated with base station 102. The registration process can ensure that the access point device 104 is secure and abides by policies set by a wireless service provider.

After the access point device 104 has registered with the base station 102 via the CHP, a mobile device 106, which was in communication with the wireless network base station 102 can initiate a session continuity process to the access point device 104. When the mobile device 106 reaches the geographic area 100 generated by the access point device 104, an auto-detect and reconnect process can be initiated on the mobile device 106. Once the mobile device 106 access to the access point device 104 is complete, the mobile device 106 current data session with the base station 102 can be terminated, and a new data session can be switched to the access point device 104. The access point device 104 registration process can also comprise a neighbor list of available access point devices within the geographic area 100, which are also available for the mobile device 106 to utilize for the session continuity process. The CHP can assign access priority for each local access point device per a cellular network policy.

Figure 2:
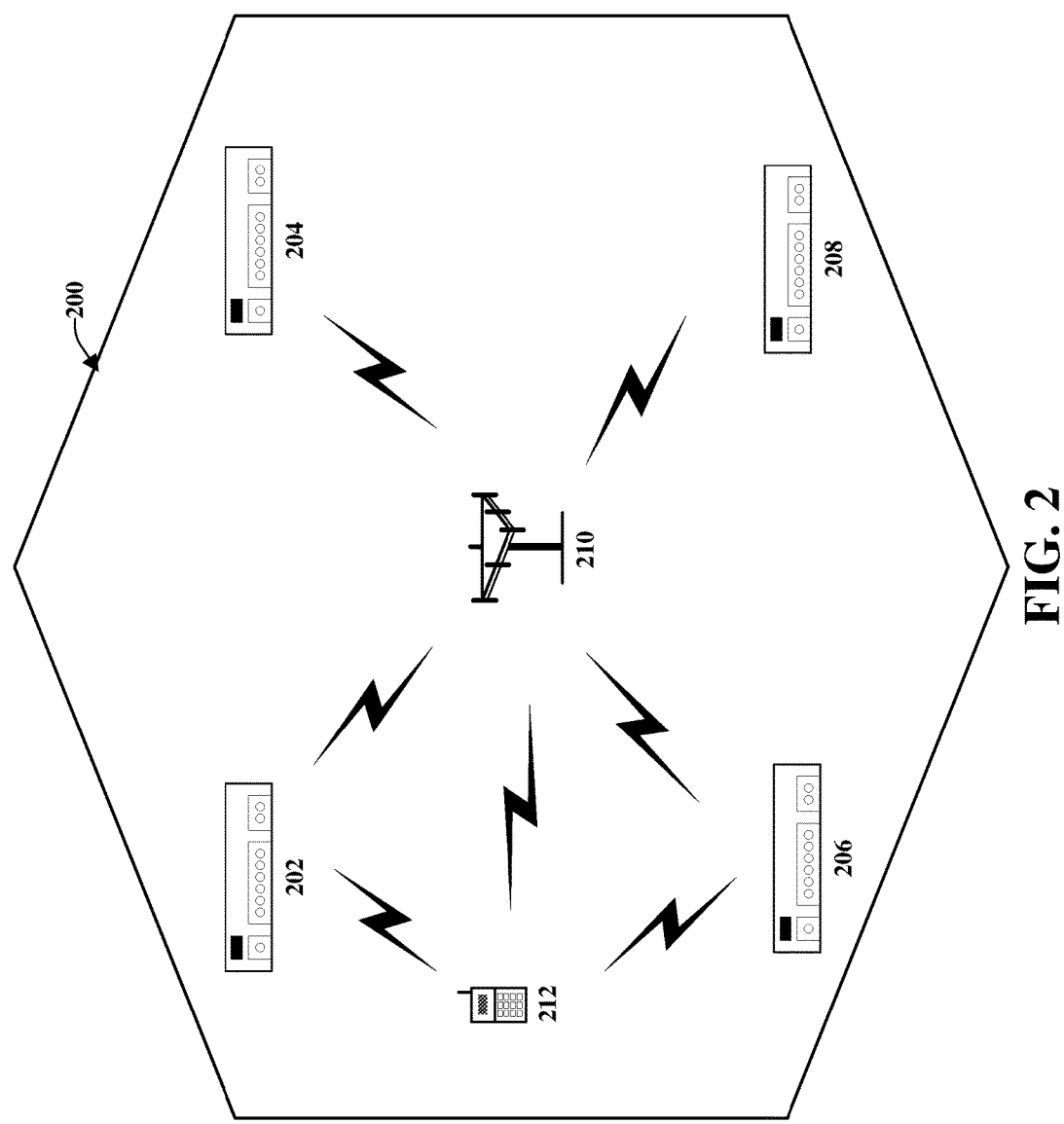
FIG. 2 illustrates an example wireless network wherein several access point devices have registered with a base station device according to one or more embodiments.

Referring now to FIG. 2, illustrated is an example wireless network wherein several access point devices have registered with a base station device according to one or more embodiments. A base station 210 can comprise an access point devices 202 204 206 208 within its respective geographic area 200. As represented in FIG. 2, the base station 210 can comprise the access point devices 202 204 206 208 because they are located within the geographic area 200.

Each access point device 202 204 206 208 can register with the base station 210 via a CHP that can be implemented in a backhaul network. The access point devices 202 204 206 208 can be reconfigured to meet specific security and QoE requirements. For example, the access point device 202 can register with the base station 210 via a CHP associated with the base station 210. The registration process can ensure that the access point device 202 is secure and abides by policies set by a wireless service provider.

After the access point device 202 has registered with the base station 210 via the CHP, a mobile device 212, which was in communication with the wireless network base station 210 can initiate a session continuity process to the access point device 202. When the mobile device 212 is within range of the access point device 202, an auto-detect and reconnect process can be initiated on the mobile device 212. Once the mobile device 212 access to the access point device 202 is complete, the mobile device 212 current data session with the base station 210 can be terminated, and a new data session can be switched to the access point device 202. The access point device 202 registration process can also comprise a neighbor list of available access point devices 204 206 208 within the geographic area 200, which are also available for the mobile device 212 to utilize for the session continuity process.

The CHP can assign access priority for each local access point device per a cellular network policy. After the access point devices 202 204 206 208 have registered with the base station 210 via the CHP, a priority can be assigned to each access point device 202 204 206 208. For example, although the mobile device 212 may be in closer proximity to the access point device 202, the CHP may direct the mobile device to 210 to offload data to the access point device 206 based on a priority assigned wherein the access point device 206 has a higher priority than the access point device 202. The CHP can also dictate that a data session between the access point device 202 and the mobile device 212 be transferred to the access point device 206 as the mobile device transitions throughout the geographic area 200.

Figure 3:
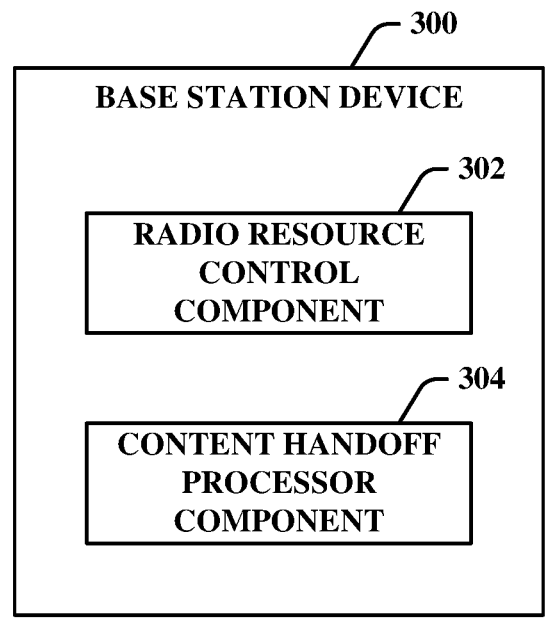
FIG. 3 illustrates example base station device components according to one or more embodiments.

Referring now to FIG. 3, illustrated are example base station device components according to one or more embodiments. The base station device 300 can comprise a radio resource control component 302 and a content handoff processor (CHP) component 304 in conjunction with a backhaul network. The base station device 300 cellular radios can transmit and receive signals independently and simultaneously via a cellular tower antenna. Thus, the RF connection in the wireless network can be managed by the radio resource control (RRC) component 302. Functions of the RRC can comprise connection establishment and release functions, broadcast of system information, radio bearer establishment reconfiguration and release, RRC connection mobility procedures, paging notification and release and outer loop power control.

The CHP can be implemented in a backhaul network associated with a base station device. Access point devices can register for base station devices via the CHP 304 through the cellular tower antenna. The CHP can also assign a priority for each access point device based on a cellular network policy. Further, one CHP can cover multiple base station devices. The CHP can estimate a mobile device's speed through cellular tower coverage and if the mobile device's speed is high, the CHP can reject an access request. The mobile device can then remain on cellular access and not switch to the access point device. The CHP can also approve session continuity to an access point device if a mobile device's speed is low or some other condition, such as priority, is satisfied.

Figure 4:
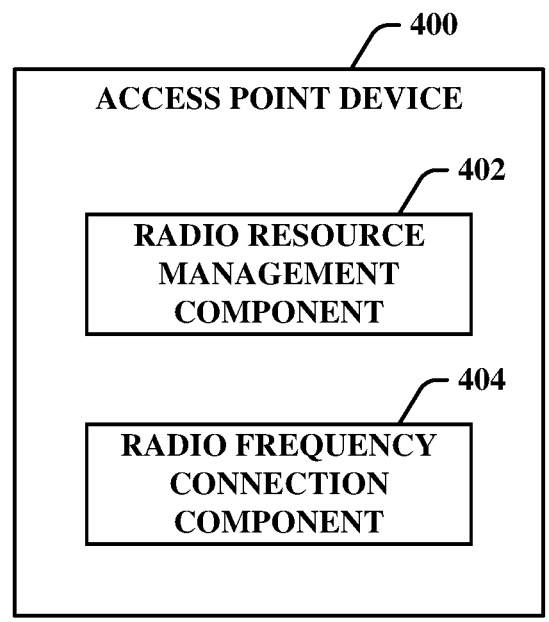
FIG. 4 illustrates example access point device components according to one or more embodiments.

Referring now to FIG. 4, illustrated are example access point device components according to one or more embodiments. An access point device 400 can be any device, which can serve as an access point to a wireless network including, but not limited to, a Wi-Fi access point device. The access point device 400 can comprise a radio resource management (RRM) component 402 and a radio frequency connection (RFC) component 404.

The RRM component 402 can comprise strategies and algorithms for controlling parameters such as: transmit power, user allocation, beamforming, data rates, handover criteria, modulation schema, error coding schemes, etc., whereas the RFC component 404 can control the data transmission between a mobile device and the access point device 400.

Figure 5:
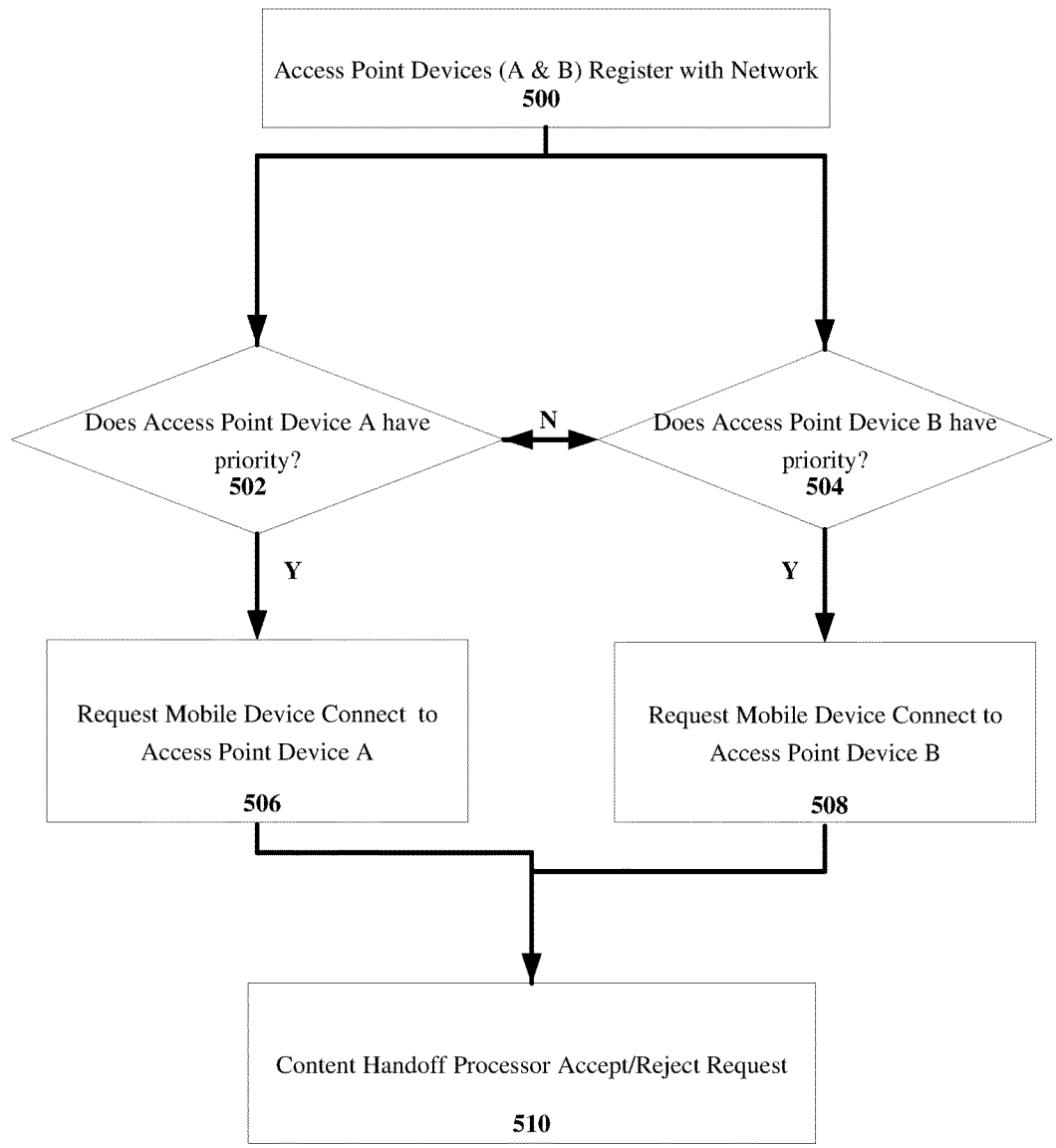
FIG. 5 illustrates an example flow diagram of a priority-based access point device selection process according to one or more embodiments.

Referring now to FIG. 5, illustrated is an example flow diagram of a priority-based access point device selection process according to one or more embodiments. At element 500 an access point device A and an access point device B can register with a base station of a wireless network via a CHP. Each access point device can register with the CHP, which can be implemented in a backhaul network. The access point devices can be reconfigured to meet specific security and QoE requirements as set forth by policies set by a wireless service provider. After the access point devices have registered with the CHP, at elements 502 and 504 the CHP can determine whether access point device A has priority or whether access point device B has priority, respectively. The determination of priority can be based on speed, data throughput, geographic location, etc. If it is determined that access point device A has priority at element 502, then a request for a mobile device to connect with access point device A is sent at element 506. The CHP then has the opportunity to accept or reject the request at element 510. If it is determined that access point device B has priority at element 504, then a request for a mobile device to connect with access point device B is sent at element 508. Alternatively, the CHP then has the opportunity to accept or reject the request at element 510.

Figure 6:
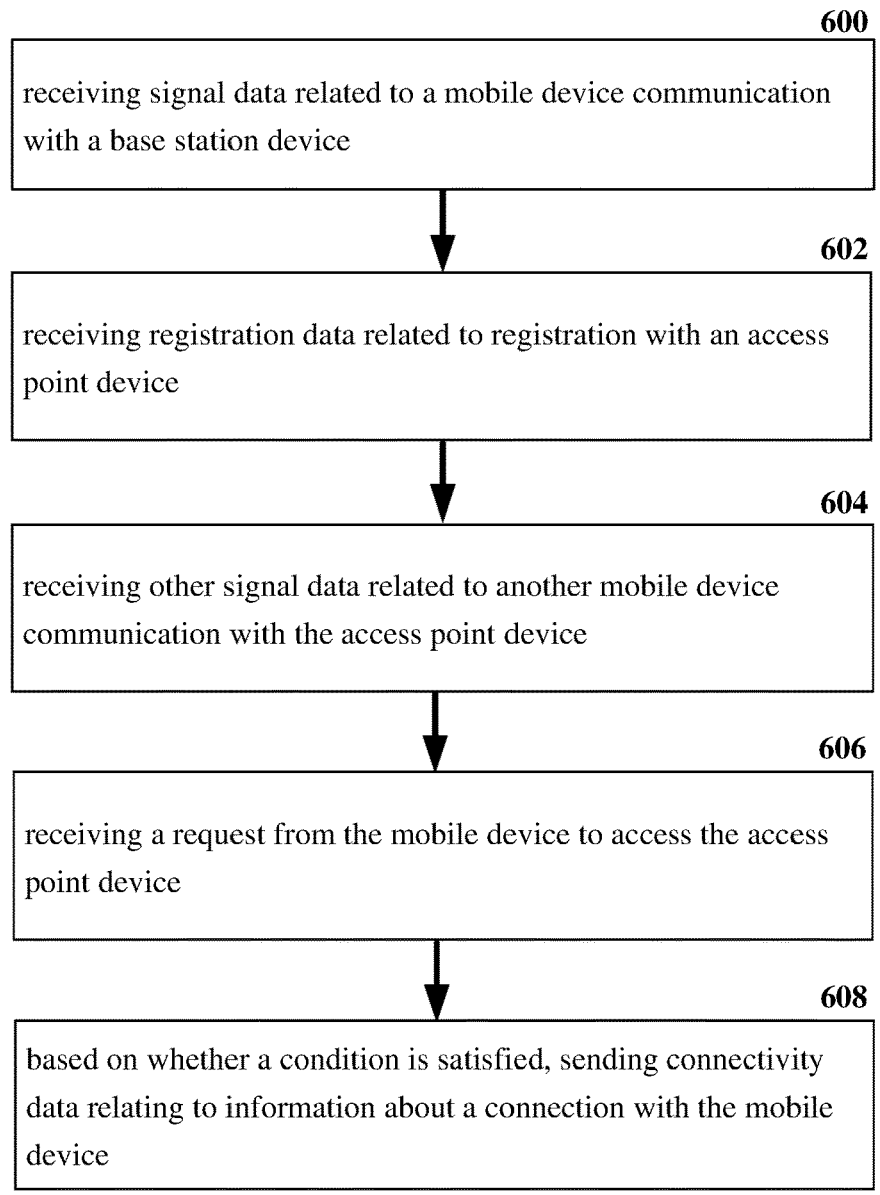
FIG. 6 illustrates an example schematic system block diagram for wireless network traffic session continuity according to one or more embodiments.

Referring now to FIG. 6, illustrated is an example schematic system block diagram for wireless network traffic session continuity according to one or more embodiments. At element 600, a wireless network device comprising a processor, can receive signal data related to a mobile device communication with a base station device. The mobile device communication with the base station device can comprise packet data or voice data. At element 602 registration data related to registration with an access point device can be received. Each access point device can register with a CHP, which can be implemented in a backhaul network. The access point devices can then be reconfigured to meet specific security and QoE requirements as set forth by policies set by a wireless service provider. Other signal data related to another mobile device communication with the access point device can be received at element 604. The other signal data can comprise an attempt by the mobile device to initiate communication with the access point device.

The wireless network device can then receive a request from the mobile device to access the access point device at element 606, and based on whether a condition is satisfied, sending connectivity data relating to information about a connection with the mobile device at element 608. For instance, the wireless network device can send information to the access point device or the mobile device. The information can comprise an indication that the condition was satisfied, an indication that the condition was not satisfied, and/or an indication of what the condition is.

Figure 7:
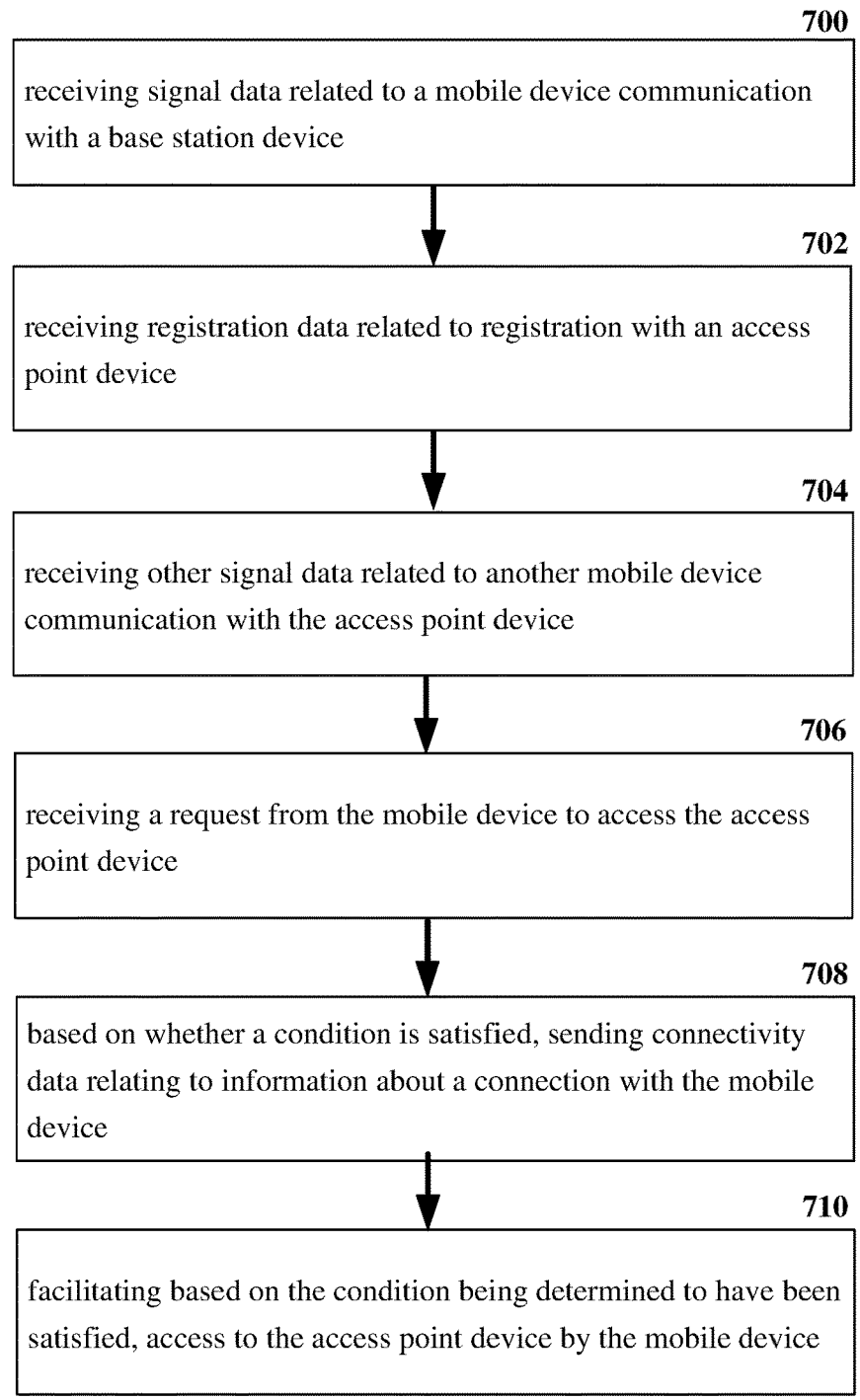
FIG. 7 illustrates an example schematic system block diagram for wireless network traffic session continuity and facilitation of access to the access point device according to one or more embodiments.

Referring now to FIG. 7, illustrated is an example schematic system block diagram for wireless network traffic session continuity and facilitation of access to the access point device according to one or more embodiments. At element 700, a wireless network device comprising a processor, can receive signal data related to a mobile device communication with a base station device. The mobile device communication with the base station device can comprise packet data or voice data. At element 702 registration data related to registration with an access point device can be received. Each access point device can register with a CHP, which can be implemented in a backhaul network. The access point devices can then be reconfigured to meet specific security and QoE requirements as set forth by policies set by a wireless service provider. Other signal data related to another mobile device communication with the access point device can be received at element 704. The other signal data can comprise an attempt by the mobile device to initiate communication with the access point device.

The wireless network device can then receive a request from the mobile device to access the access point device at element 706, and based on whether a condition is satisfied, sending connectivity data relating to information about a connection with the mobile device at element 708. For instance, the wireless network device can send information to the access point device or the mobile device. The information can comprise an indication that the condition was satisfied, an indication that the condition was not satisfied, and/or an indication of what the condition is. Furthermore, the wireless network device can facilitate access to the access point device by the mobile device based on the condition of element 708 being determined to have been satisfied at element 710.

Figure 8:
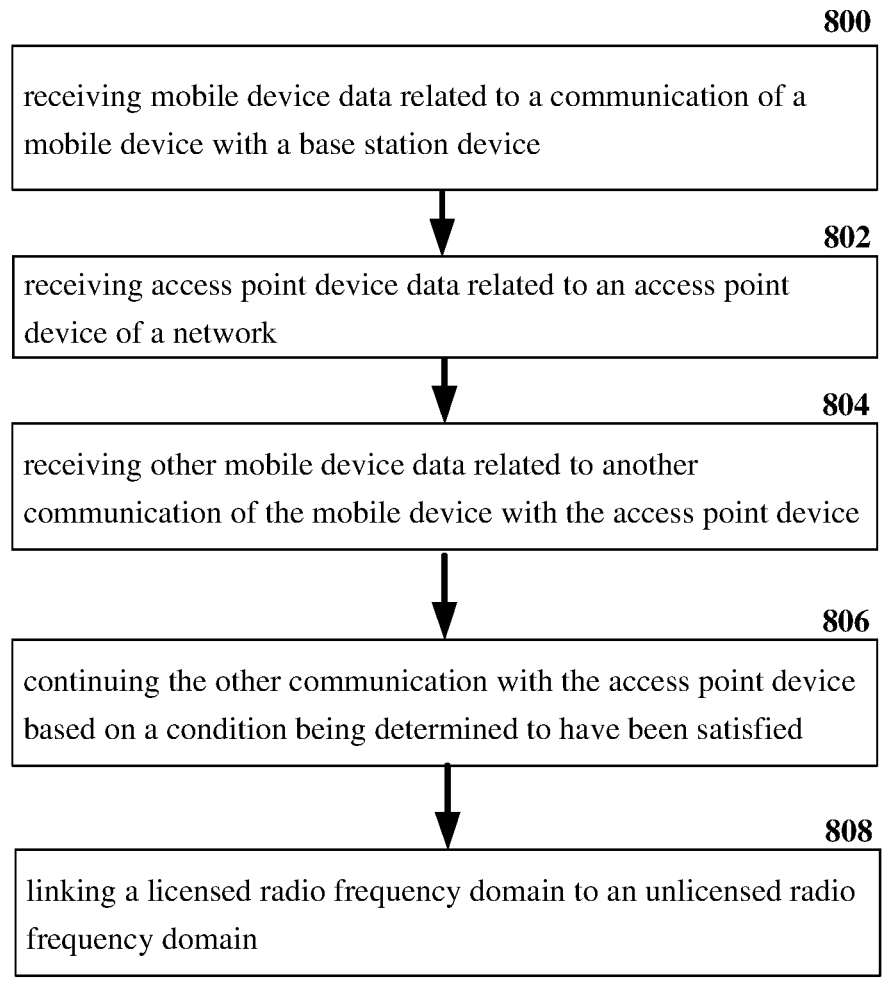
FIG. 8 illustrates an example schematic system block diagram for wireless network traffic session continuity based on a condition being satisfied according to one or more embodiments.

Referring now to FIG. 8, illustrated is an example schematic system block diagram for wireless network traffic session continuity based on a condition being satisfied according to one or more embodiments. At element 800 mobile device data related to a communication of a mobile device with a base station device can be received. The mobile device communication with the base station device can comprise packet data or voice data. Access point device data related to an access point device of a network can be received at element 802. The access point device data can comprise geographic location data and/or registration data. Each access point device can register with a CHP, which can be implemented in a backhaul network. The access point devices can then be reconfigured to meet specific security and QoE requirements as set forth by policies set by a wireless service provider.

Figure 9:
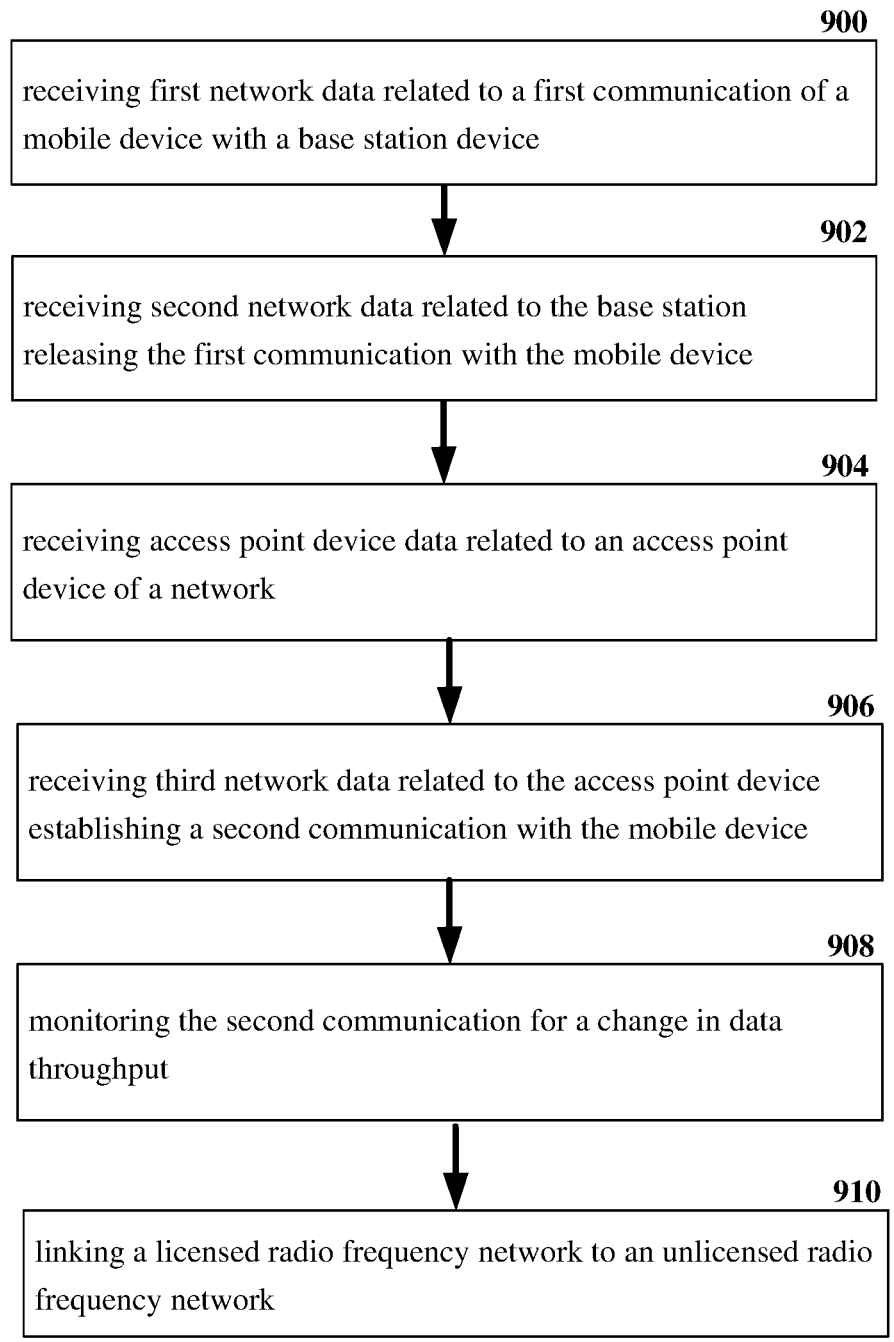
FIG. 9 illustrates an example schematic system block diagram for wireless network session continuity by releasing communication with a base station device and establishing communication with an access point device according to one or more embodiments.

At element 804, the system can receive other mobile device data related to another communication of the mobile device with the access point device. The other mobile device data can comprise an attempt by the mobile device to initiate communication with the access point device. The communication with the access point device at element 804 can be continued at element 806 based on a condition being determined to have been satisfied. The condition can be related to a speed of the mobile device, a throughput of data from the mobile device to the access point device, the geographic location of the access point device, a priority-based system, etc. At element 808, the system can link a licensed radio frequency domain to an unlicensed radio frequency domain Referring now to FIG. 9, illustrated is an example schematic system block diagram for wireless network traffic session continuity by releasing communication with a base station device and establishing communication with an access point device according to one or more embodiments. At element 900, first network data related to a first communication of a mobile device with a base station device can be received. The mobile device communication with the base station device can comprise packet data or voice data. At element 902, second network data related to the base station releasing the first communication with the mobile device can be received. The base station can release communication with the mobile device based on an indication that a registered access point device can overtake communication with the mobile device. Each access point device can register with a CHP, which can be implemented in a backhaul network. The access point devices can then be reconfigured to meet specific security and QoE requirements as set forth by policies set by a wireless service provider. Access point device data related to an access point device of a network can then be received at element 904.

At element 906, third network data related to the access point device establishing a second communication with the mobile device can be received. Once the CHP has made a determination that a specific access point device can maintain communication with the mobile device data related to a connection of the mobile device to the access point device can be received by the system. The system can also monitor the second communication for a change in data throughput at element 908. The monitoring can be used to determine if the system ever needs to offload data to another access point device based on a defined priority scheme. At element 910, a licensed radio frequency network can be linked to an unlicensed radio frequency network.

Figure 10:
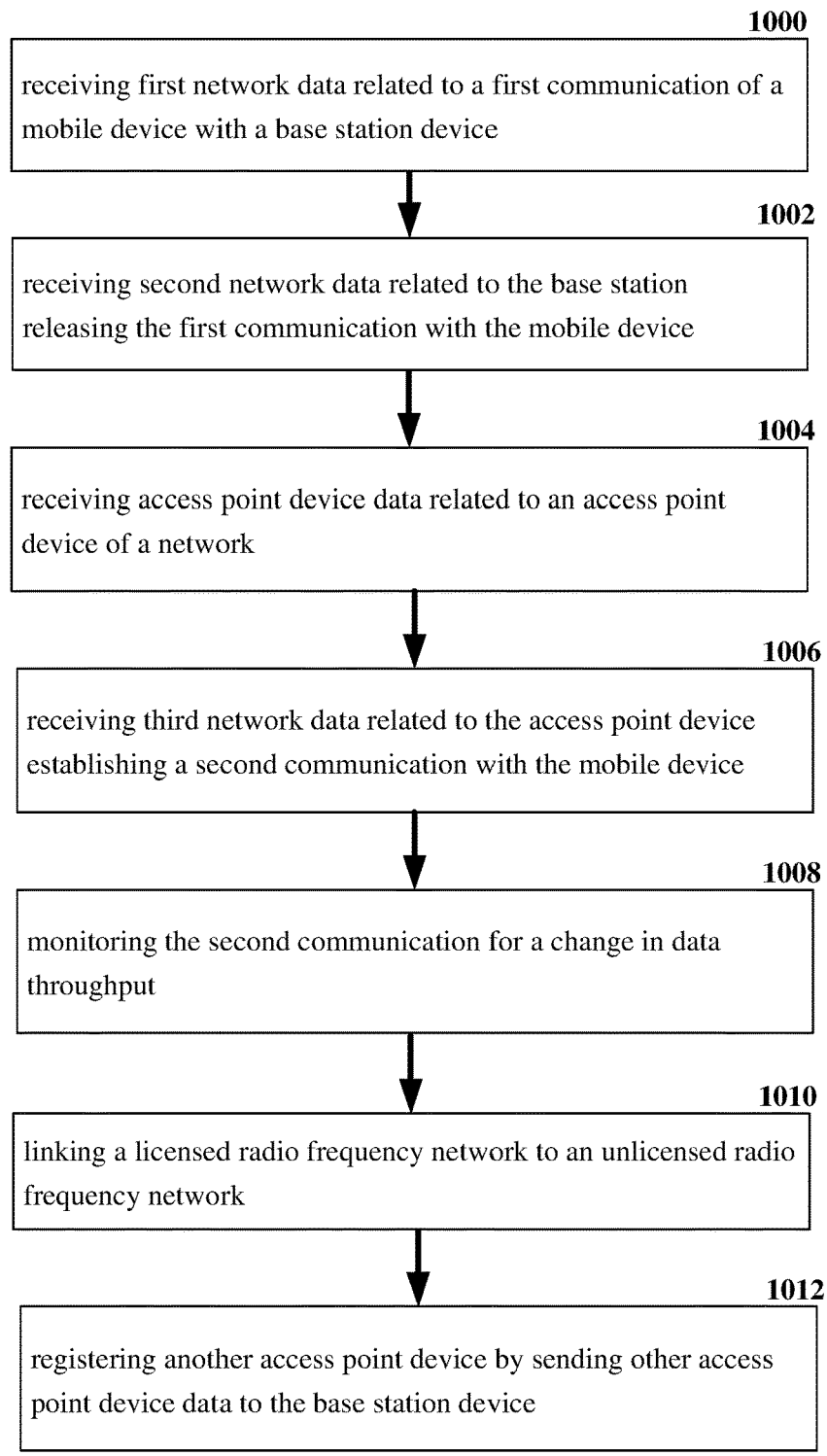
FIG. 10 illustrates an example schematic system block diagram for wireless network session continuity by releasing communication with a base station device, establishing communication with an access point device, and registering the access point device with the based station device according to one or more embodiments.

Referring now to FIG. 10, illustrated is an example schematic system block diagram for wireless network traffic session continuity by releasing communication with a base station device, establishing communication with an access point device, and registering the access point device with the based station device according to one or more embodiments. At element 1000, first network data related to a first communication of a mobile device with a base station device can be received. The mobile device communication with the base station device can comprise packet data or voice data. At element 1002, second network data related to the base station releasing the first communication with the mobile device can be received. The base station can release communication with the mobile device based on an indication that a registered access point device can overtake communication with the mobile device. Each access point device can register with a CHP, which can be implemented in a backhaul network. The access point devices can then be reconfigured to meet specific security and QoE requirements as set forth by policies set by a wireless service provider. Access point device data related to an access point device of a network can then be received at element 1004.

At element 1006, third network data related to the access point device establishing a second communication with the mobile device can be received. Once the CHP has made a determination that a specific access point device can maintain communication with the mobile device data related to a connection of the mobile device to the access point device can be received by the system. The system can also monitor the second communication for a change in data throughput at element 1008. The monitoring can be used to determine if the system ever needs to offload data to another access point device based on a defined priority scheme. At element 1010, a licensed radio frequency network can be linked to an unlicensed radio frequency network. Furthermore, at element 1012, another access point device can be registered by sending other access point device data to the base station device.

Figure 11:
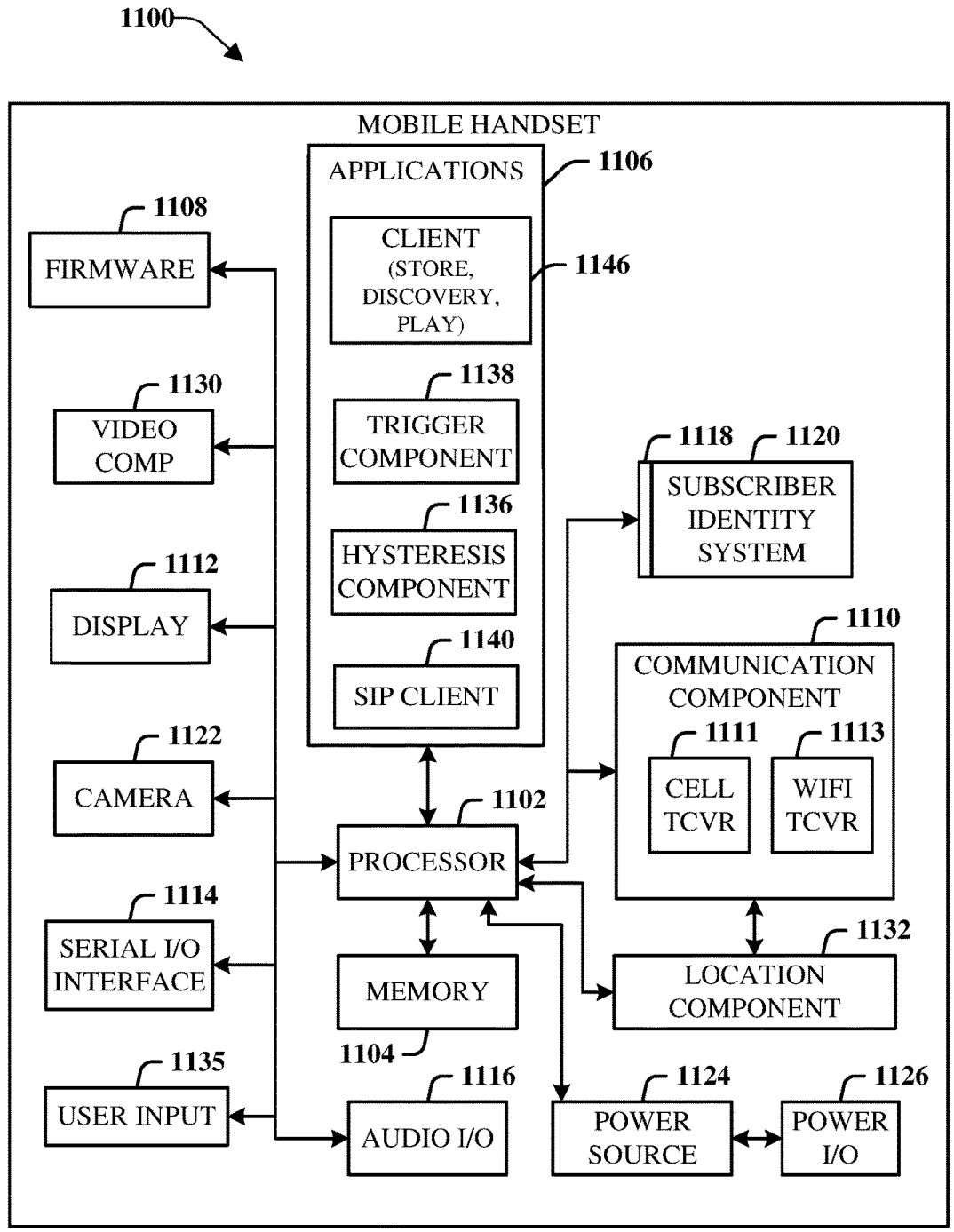
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
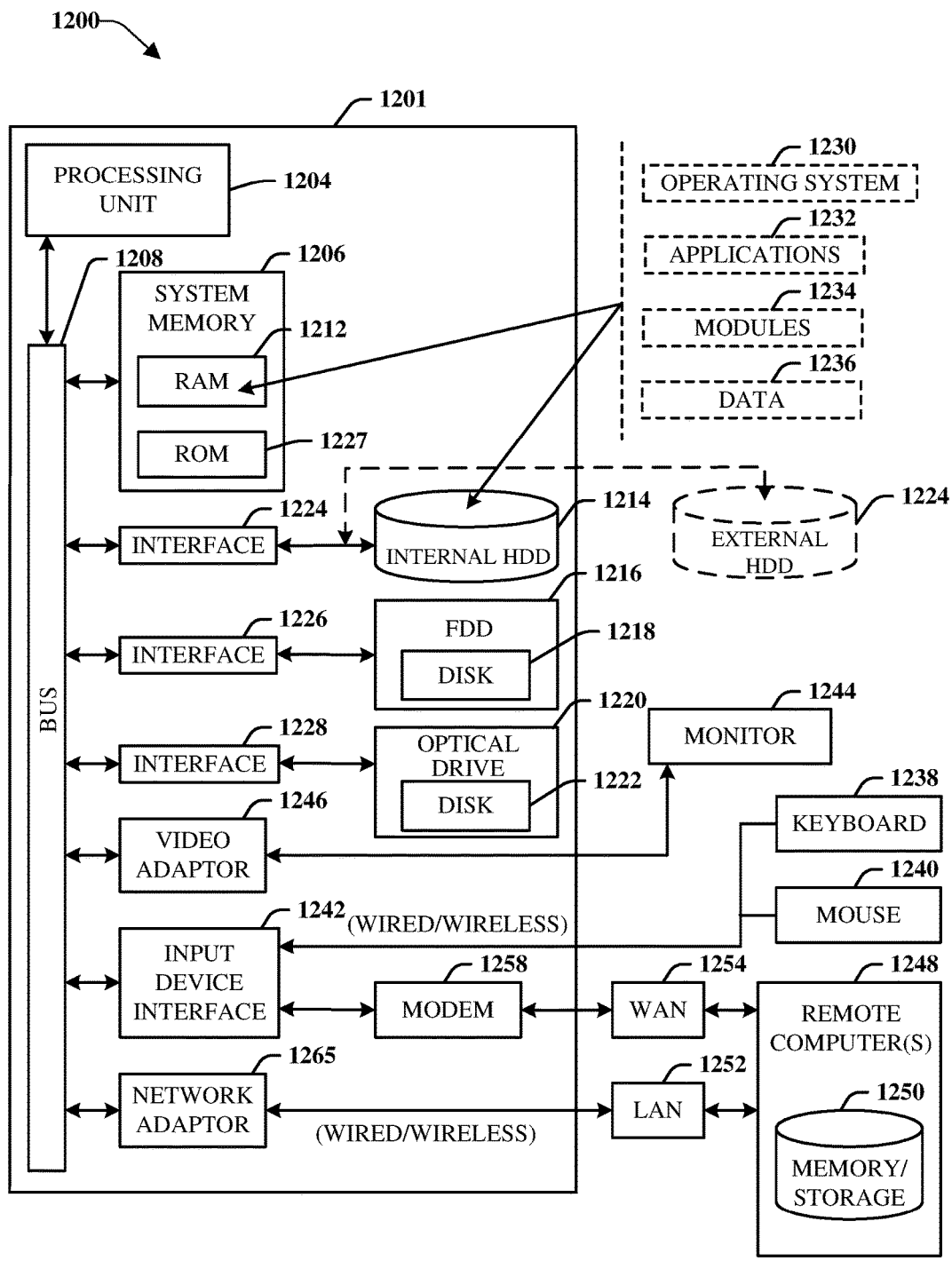
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a wireless network device comprising a processor, first signal data related to a communication of a first mobile device with a base station device;
    receiving, by the wireless network device, second signal data related to a second mobile device communication with an access point device;
    receiving, by the wireless network device, a request from the first mobile device to access the access point device; and
    based on whether a condition has been determined to have been satisfied, sending, by the wireless network device to the first mobile device, connectivity data relating to information about a connection with the first mobile device.

2. The method of claim 1, further comprising:
    based on the condition being determined to have been satisfied, facilitating, by the wireless network device, the access to the access point device by the first mobile device.

3. The method of claim 2, wherein satisfaction of the condition comprises a speed of the first mobile device being at least a defined speed.

4. The method of claim 1, wherein the connectivity data comprises an indication that the access to the access point device has been granted.

5. The method of claim 1, wherein the connectivity data comprises an indication that the access to the access point device has been denied based on the condition being determined not to have been satisfied.

6. The method of claim 2, wherein the condition is a first condition, and further comprising:
    in response to a second condition being determined to have been satisfied, terminating, by the wireless network device, the access to the access point device.

7. The method of claim 1, wherein the connectivity data comprises session continuity data related to the first mobile device transitioning from a licensed spectrum to an unlicensed spectrum.

8. A system, comprising:
    a processor; and
    a memory that stores executable instructions that, when executed by the processor, facilitate performance of operations, comprising:
        receiving first mobile device data related to a first communication of a first mobile device with a base station device;
        receiving access point device data related to an access point device of a network and second mobile device data related to a second communication of a second mobile device with the access point device;
        continuing the second communication with the access point device based on a condition being determined to have been satisfied; and
        linking a licensed radio frequency domain to an unlicensed radio frequency domain.

9. The system of claim 8, wherein the condition comprises an analysis of whether a speed of the first mobile device is at least a defined speed.

10. The system of claim 8, wherein the operations further comprise:
    generating a priority data structure associated with a priority of the access point device.

11. The system of claim 8, wherein the condition is related to a priority associated with the access point device.

12. The system of claim 11, wherein the priority is based on an availability of the access point device in relation to other access point devices.

13. The system of claim 8, wherein the operations further comprise:
    receiving cellular network data in response to the continuing the second communication with the access point device.

14. The system of claim 13, wherein the cellular network data comprises internet protocol socket data.

15. The system of claim 8, wherein the operations further comprise:
receiving time data related to the access point device, and wherein the time data is associated with adjusting the first mobile device data and the second mobile device data to be in synchronization.

16. A non-transitory machine-readable medium, comprising executable instructions that, when executed by a processor, facilitate performance of operations, comprising:
receiving first network data related to a base station device releasing a first communication with a mobile device;
receiving access point device data related to an access point device of a network;
receiving second network data related to the access point device that is establishing a second communication with the mobile device;
monitoring the second communication for a change in data throughput; and
in response to the monitoring, linking a licensed radio frequency network to an unlicensed radio frequency network.

17. The non-transitory machine-readable medium of claim 16, wherein the access point device is a first access point device, wherein the access point device data is first access point device data, and wherein the operations further comprise:
registering a second access point device by sending second access point device data to the base station device.

18. The non-transitory machine-readable medium of claim 16, wherein the operations further comprise:
in response to the establishing the second communication with the mobile device, requesting cellular network data.

19. The non-transitory machine-readable medium of claim 18, wherein the cellular network data comprises connection data related to a wireless connection between the base station device and the mobile device.

20. The non-transitory machine-readable medium of claim 16, wherein the operations further comprise:
in response to the change in the data throughput, terminating the second communication with the mobile device.

* * * * *